US007971258B1

(12) United States Patent
Liao et al.

(10) Patent No.: US 7,971,258 B1
(45) Date of Patent: Jun. 28, 2011

(54) METHODS AND ARRANGEMENT FOR EFFICIENTLY DETECTING AND REMOVING MALWARE

(75) Inventors: En-Yi Liao, Santa Clara, CA (US); Richard Hsu, Taipei (TW); Franson Fang, Nanjing (CN); Zhihe Zhang, Nanjing (CN); Flanker Lu, Nanjing (CN); Serend Lin, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 942 days.

(21) Appl. No.: 11/864,312

(22) Filed: Sep. 28, 2007

(51) Int. Cl.
*G06F 12/14* (2006.01)
(52) U.S. Cl. .......................... 726/24; 713/164
(58) Field of Classification Search .............. 726/24
See application file for complete search history.

(56) References Cited

U.S. PATENT DOCUMENTS

| | | | | |
|---|---|---|---|---|
| 5,509,120 | A * | 4/1996 | Merkin et al. | 726/24 |
| 5,802,277 | A * | 9/1998 | Cowlard | 726/22 |
| 7,581,250 | B2 * | 8/2009 | Sitze | 726/22 |
| 2006/0031673 | A1 * | 2/2006 | Beck et al. | 713/164 |
| 2006/0185016 | A1 * | 8/2006 | Sitze | 726/24 |
| 2007/0113062 | A1 * | 5/2007 | Osburn et al. | 713/1 |
| 2009/0037496 | A1 * | 2/2009 | Chong et al. | 707/204 |
| 2009/0241195 | A1 * | 9/2009 | Chung et al. | 726/24 |
| 2009/0282486 | A1 * | 11/2009 | Zimmer et al. | 726/24 |
| 2010/0043072 | A1 * | 2/2010 | Rothwell | 726/24 |

* cited by examiner

*Primary Examiner* — Matthew B Smithers
(74) *Attorney, Agent, or Firm* — IP Strategy Group, P.C.

(57) ABSTRACT

A method for detecting malware in a computer that employs a production operating system during normal use is provided. The method includes activating on the computer a first operating system while the production operating system is dormant and ascertaining at least a portion of the production operating system that would be involved in booting up the computer if the production operating system had been activated instead. The method further includes scanning, while the first operating system is activated and while the production operating system is dormant, the portion of the production operating system. The method further includes neutralizing, while the first operating system is activated and while the production operating system is dormant, the malware responsive to the scanning.

20 Claims, 2 Drawing Sheets

METHODS AND ARRANGEMENT FOR EFFICIENTLY DETECTING AND REMOVING MALWARE

BACKGROUND OF THE INVENTION

The Internet is a global, publicly accessible network of interconnected computer networks, which has long been employed by users for communicating and for sharing information. As the Internet continues to evolve, the risk of a user's computer system and/or a computer network being infiltrated by malware (e.g., malicious code) also increases. Once the malware has infiltrated a user's computer system and/or computer network, extensive damage may occur. For example, the malware may be designed to delete files, rewrite the operating system's (OS) registry, install and/or modify components, and/or corrupt hard drives, etc. Therefore, detecting and/or removing malware more efficiently and intelligently is a critical task for individuals and organizations alike.

Some malwares, such as rootkits, are particularly difficult to detect since they may be capable of hiding their presence from other applications, such as malware scanning engine or anti-virus engines. To facilitate discussion, these types of malwares are herein refer to as stealth malware. Typically, stealth malware may infiltrate a user's computer system and/or computer network by, for example, modifying the boot-up sequence, installing configuration files, installing system programs, and/or installing registry keys etc., within a computer system.

Consider the situation wherein, for example, a stealth malware has infiltrated a user's computer system and installed registry keys within the user's computer system's OS registry. Once the user powers on the computer system, a Basic Input/Output System (BIOS) initiates and accesses a program boot sector to invoke the program boot sector to call an OS loader. The OS loader may be configured to load the computer's OS registry into memory. As part of the boot-up sequence, the computer system then verities the registry keys and loads application programs and drivers required to run at start-up.

Since the stealth malware has modify the registry keys of the user's computer system, the stealth malware programs are configured to be launched during start-up (e.g. during the OS boot up sequence). Therefore, the stealth malware may be running and masking its presence before an anti-virus engine may have the opportunity to discover the malicious code. Thus, extensive damage to the user's computer system and/or computer network may occur before the user may become aware of the presence of the stealth malware.

Detection and removal of stealth malware with an anti-virus engine or even by manual inspection can be difficult. For example, stealth malware may actively block other applications from detecting and/or removing the malicious code by hiding the registry keys the stealth malware has installed within the OS registry. Since the stealth malware is unable to actively hide its presence when the OS is dormant, one technique for detecting stealth malware has been to put the OS into a dormant state.

Once the OS is in a dormant state, a dormant OS scan may be performed. As the term is employed herein, dormant OS scan refers to the technique of shutting down the supposedly infected OS and scanning the entire hard disk while the infected OS is in a dormant state. By scanning the entire hard disk while the infected OS is in a dormant state, the stealth malware is prevented from actively hiding its presence (such as, for example, preventing the detection and removal of the malicious registry keys).

Traditionally, in order to execute a dormant OS scan, scanning is performed on the dormant OS using a second OS, which has not been infected. For example, once the first OS, which is suspected to be infected, has been shut down, the hard drive containing the first OS may be removed and installed onto another computer system that has a second OS, which has not been infected. Generally speaking, the task of removing a hard drive is usually not a task that an ordinary computer user may be capable of or inclined to perform since most ordinary computer user may lack the skill and/or know-how to perform this task. In addition, since the dormant OS scan requires a second computer system, the user may somehow be required to locate a second computer. Thus, for a company, the task may have to be performed by information technology (IT) personnel.

Since the stealth malware may have created many files, the clean computer system may employ an anti-virus engine to scan all of the files within the infected hard drive in order to remove most and/or all malware, including stealth malware, which may be present on the infected hard drive. Once the infected hard drive has been scanned and cleaned, the now clean hard drive may then be re-installed back into the original computer system.

Although the above-discussed dormant OS scan approach may identify and eliminate the stealth malware, the resources (people cost, time, and/or processing power) that may be consumed during the cleaning process may make the dormant OS scan method an expensive solution, especially given the large hard disk size that is typical of modern computer system. For example, it is not uncommon for a typical modern computer system, even a consumer computer system, to have 300 GB (or more) of hard disk space. Since the dormant OS scan approach generally requires the scanning of the entire hard drive, such scanning may take many hours to complete. In addition, while the dormant OS scan is taking place, the user of the infected computer system and also the user of the clean computer system may both be deprived of the usage of their computers. As a result, productivity may be negatively impacted.

SUMMARY OF INVENTION

The invention relates, in an embodiment, to a system for detecting malware in a computer storage drive that stores computer readable code implementing at least a first operating system, the computer storage drive being installed in a computer system. The system includes a second operating system different from the first operating system. The system also includes an analysis module configured to execute under the second operating system, the analysis module also being configured to ascertain, while the first operating system is inactive, at least a portion of the first operating system that would be involved in booting up the computer system if the first operating system had been activated instead. The system additionally includes a malware scanning engine configured for scanning, while the first operating system is inactive, the portion of the first operating system and neutralizing the malware responsive to the scanning, wherein the second operating system is configured to become dormant after the malware is neutralized in order to enable the first operating system to boot up the computer system.

In another embodiment, the invention relates to a method for detecting malware in a computer that employs a production operating system during normal use. The method includes activating on the computer a first operating system different from the production operating system, the activating being performed while the production operating system is dormant. The method also includes ascertaining, while the first operating system is activated and while the production operating system is dormant, at least a portion of the production operating system that would be involved in booting up the computer if the production operating system had been activated instead. The method further includes scanning, while the first operating system is activated and while the production operating system is dormant, the portion of the production operating system. The method further includes neutralizing, while the first operating system is activated and while the production operating system is dormant, the malware responsive to the scanning.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
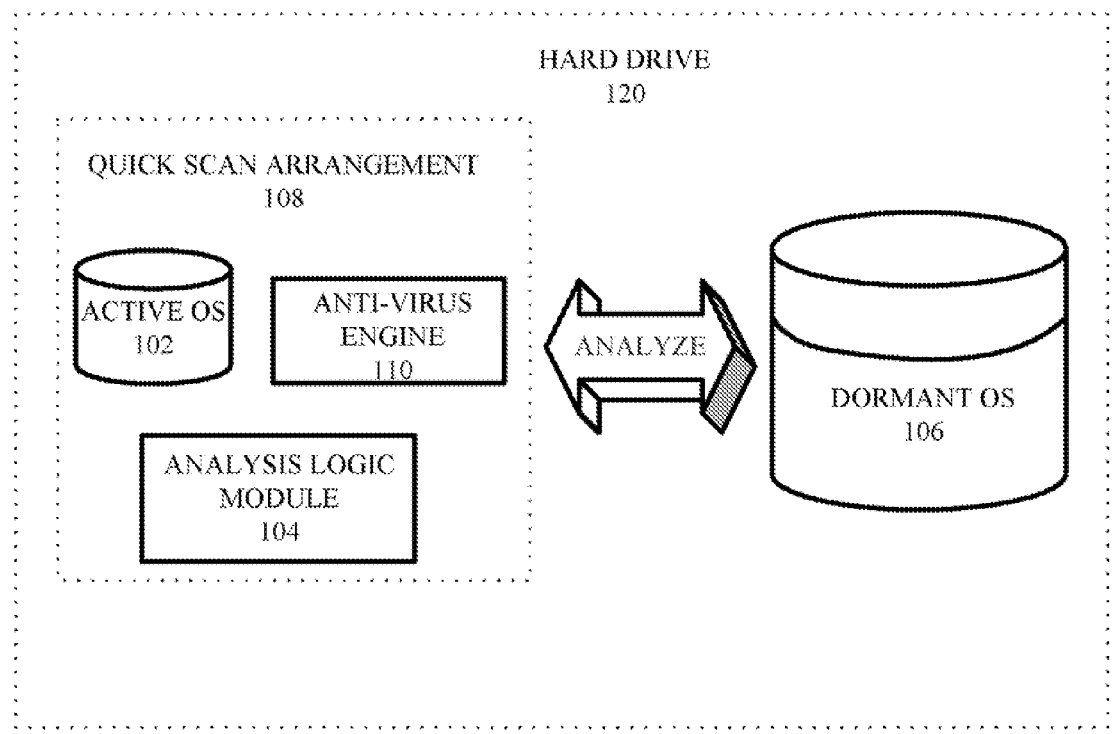
FIG. 1 shows, in an embodiment, a quick scan arrangement for detecting and resolving stealth malware in an infected hard drive.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

As aforementioned, stealth malware may be initiated during the boot-up sequence of a computer system. Since stealth malware is proficient in hiding its presence from other applications, such as anti-virus engines, when the stealth malware is actively running, the prior art solution has to scan the entire infected hard drive when the stealth malware is inactive in order to identify and remove the stealth malware. However, the dormant OS scan of the prior art is inefficient in that a large amount of resources may have to be dedicated to cleaning the infected hard drive.

In one aspect of the invention, the inventors herein realized that the number of files that may have to be scanned may be significantly reduced by applying knowledge about malwares in identifying possible hiding places for the stealth malware. Since the stealth malware has to be actively running in order to hide its presence from other applications, such as the anti-virus engines, the inventors herein realized that files that may have to be scanned may be those files that are launched during start-up. Thus, the entire hard drive does not have to be scanned in order to identify and remove the stealth malware. Instead, the inventors herein realized that by scanning the files that may be associated with the boot-up sequence, such as the registry keys and/or the configuration settings, the files that may be associated with the stealth malware may be identified and cleaned/removed without having to scan the entire hard drive.

In accordance with embodiments of the invention, a quick scan arrangement and methods may be employed to efficiently and effectively detect malware, especially stealth malware. Embodiments of the invention include identifying configurable boot-up sequence that may be associated with files and/or folders.

In this document, various implementations may be discussed using stealth malware as examples. This invention, however, is not limited to stealth malware and may include any malicious code that may cause harm and/or damage to a user's computer system. Instead, the discussions are meant as examples and the invention is not limited by the examples presented.

In one or more embodiments of the invention, the quick scan arrangement may include an active OS, an anti-virus engine, and an analysis logic module. Since the primary OS of the computer system is associated with the infected hard drive, a secondary OS, such as the active OS, is required in order to enable the scanning of the infected hard drive. Once the active OS has been activated, the analysis logic module may be activated.

In an embodiment, the analysis logic module is configured to identify portions of the infected hard drive that may be modified by the stealth malware. As aforementioned, since stealth malwares usually modify portions of the hard drive OS in order to enable the stealth malware to be launched upon start-up, the analysis logic module may be configured to analyze portions of the OS that may be related to booting up the system, such as an OS registry's program files and/or system configuration files. As can be appreciated from the foregoing, the analysis logic module may be implemented as part of the anti-virus engine or independent of the anti-virus engine.

Unlike the prior art, the quick scan arrangement may be run within the infected computer system. In an embodiment, the quick scan arrangement may be implemented as a virtual OS arrangement. In another embodiment, the quick scan arrangement may be implemented within a peripheral component (e.g., a compact disc (CD), a digital video disc (DVD), a flash drive, a hard drive, etc.). In yet other embodiments, the quick scan arrangement may be implemented by hardware (such as IC chips, including Field Programmable Gate Array or FPGA or other programmable chips) or a combination of hardware and software. In yet other embodiments, individual components of the quick scan arrangement may be implemented, either singly or in various combinations, on different drives, peripheral components and/or hardware circuits or chips. For example, the analysis logic and/or the anti-virus engine may be implemented on the same or different hardware circuits and/or FPGAs in some embodiments.

By running the quick scan arrangement within the infected computer system, the complicated task of removing the infected hard drive from one computer system and installing the infecting hard drive onto another computer system is eliminated. Thus, the time and resources that may have been dedicated to perform the task may now be reallocated.

To illustrate how the quick scan arrangement may be employed to minimize scanning processing time, consider the situation wherein, for example, a stealth malware has infiltrated a user's computer system and installed registry keys within the computer's OS registry.

In the prior art, the dormant OS scan may scan the entire hard drive partitions of an OS suspected to be infected with malicious code. However, as aforementioned, the entire hard drive does not have to be scanned if the set of files that may be associated with the stealth malware is identifiable. In an embodiment of the invention, a quick scan arrangement may be applied to perform intelligent scanning of specific section of the hard drive.

In an embodiment of the invention, an analysis logic module may be activated to perform an analysis of the infected hard drive in order to enumerate boot-up parameters (e.g., the registry keys and/or configuration settings) of the dormant OS. As aforementioned, the stealth malware generally modifies portions of an OS that may allow the stealth malware to be launched during startup. Once the boot-up parameters have been identified, the analysis logic module may evaluate the boot-up parameters (such as registry keys and/or configuration settings) to determine if the boot-up parameters are associated with any start-up file. Since the stealth malware is inactive while the OS is dormant, the stealth malware is unable to mask its presence and the analysis logic module is able to identify all possible boot-up parameters, including the one that may usually be hidden by the stealth malware. As the term is employed herein, a start-up file refers to a file that loads or is utilized to load applications when a computer system first boots up. If the boot-up parameters (e.g., registry keys and/or configuration settings) are associated with start-up files, the start-up files are then scanned for potential stealth malware.

If one or more stealth malware are identified, an anti-virus engine may be employed to handle (such as, clean, quarantine, or delete the stealth malware) the stealth malware. Also, the corresponding boot-up parameters (e.g., registry keys and/or configuration settings) associated with the stealth malwares may be removed from the OS registry.

The features and advantages of the invention may be better understood with reference to the figures and discussions that follow.

FIG. 1 shows, in accordance with an embodiment of the present invention, a quick scan arrangement (108) for detecting and resolving stealth malware in an infected hard drive (120). Consider the situation wherein, for example, a stealth malware has infiltrated a user's computer system and has modified the computer system's production OS (such as installing registry keys or modifying configurable OS settings) in order to enable the stealth malware to be launched when the production OS is being booted up. To facilitate discussion, the stealth malware is hereinafter refers to as "boot time-related malware". As the term is employed herein, a production OS represents the OS employed during the normal course of computer usage.

Generally speaking, once the boot time-related malware has been activated as part of the production OS boot-up sequence, the boot time-related malware may become extremely difficult to detect due to the boot time-related malware ability to mask itself in order to evade detection. In order to ensure that the boot time-related malware does not have a chance to be executed and thereby being able to mask its presence, the production OS of the infected hard drive (120) may be kept inactive as a dormant OS 106. However, without the production OS running, the anti-virus engine within the production OS environment is also dormant. In the prior art, the infected hard drive may have been removed and installed in a clean OS environment (usually on clean computer system) in order to enable an anti-virus engine located in the clean OS environment to perform its scanning function. Unlike the prior art, quick scan arrangement 108 enables infected hard drive (120) to remain in the same computer system while the boot time-related malware is being identified and handled. As can be appreciated from the foregoing, quick scan arrangement 108 may be a virtual arrangement within the same computer system or may be located within a peripheral component, such as a compact disc (CD), a flash drive, another hard drive, and the like.

In an embodiment, quick scan arrangement 108 may include an OS that is different from the infected OS. To facilitate discussion, the OS within quick scan arrangement 108 is hereinafter known as an active OS 102. Since active OS 102 is a different OS from dormant OS 106, the configurable settings and locations associated with dormant OS 106 are not activated by booting up active OS 102. Consequently, boot time-related malware remains inactive since dormant OS 106 is inactive, thereby preventing the boot time-related malware from masking its presence and making the boot time-related malware more susceptible to detection.

In an embodiment of the invention, quick scan arrangement 108 may also include an analysis logic module 104, which may be configured for at least identifying specific files, which may be associated with the boot time-related malware, out of a plethora of files, which may reside on the infected hard drive. In one or more embodiments, analysis logic module 104 may include logic that may incorporate knowledge about the working of an OS and stealth malware, such as boot time-related malware, to ascertain the files and/or folders associated with configurable locations (e.g., registries, configurable settings, or any other configurable data structures) that may have to be scanned. Since the boot time-related malware has been prevented from being activated, the boot time-related malware is unable to mask its presence. Accordingly, the registry keys and/or configuration settings that may be associated with the dormant boot time-related malware are not hidden, thereby enabling the analysis logic module to identify all of the boot-up parameters, including the usually hidden registry keys and/or configuration settings.

In an embodiment, quick scan arrangement 108 may include an anti-virus engine 110 for detecting and eliminating boot time-related malware. Once the boot-up parameters (e.g., configurable locations) to be scanned have been ascertained by analysis logic module 104, anti-virus engine 110 may scan the associated files and/or folders associated with the ascertained boot-up parameters. Anti-virus engine 110 may be configured for at least detecting, neutralizing, and/or eliminating the boot time-related malware. Since the boot-up parameters and the related files and/or folders usually represent only a small percentage of the overall data structures, settings, files, and folders of the hard drive, the scanning for boot time-related malware performed by anti-virus engine 110 may be quite fast. In an example, scanning an entire 300 gigabyte hard drive may takes hours whereas scanning the files and/or folders associated with the configurable portions of the production OS may only take a few minutes.

Once the boot time-related malware has been handled, quick scan arrangement 108 may be deactivated and dormant OS 106 may be re-activated. As can be appreciated from the foregoing, quick scan arrangement 108 may be configured to detect malwares that are capable of masking their presence. Thus, even if there are additional malwares that may not be identified, the remaining malwares may represent malwares that are unlikely to mask its presence and therefore may be identified by a standard scanning arrangement. Accordingly, a user is able to employ his computer system while the standard scanning arrangement is scanning for non-stealth malware. In this manner, delay and/or disruption to the productivity of the user due to the process of identifying and handling boot time-related malware may be substantially minimized since such delay and/or disruption may be limited to the time needed for the quick scan arrangement to identify and scan the aforementioned files and/or folders associated with the ascertained configurable locations, which are significantly less voluminous than the entire hard drive.

Figure 2:
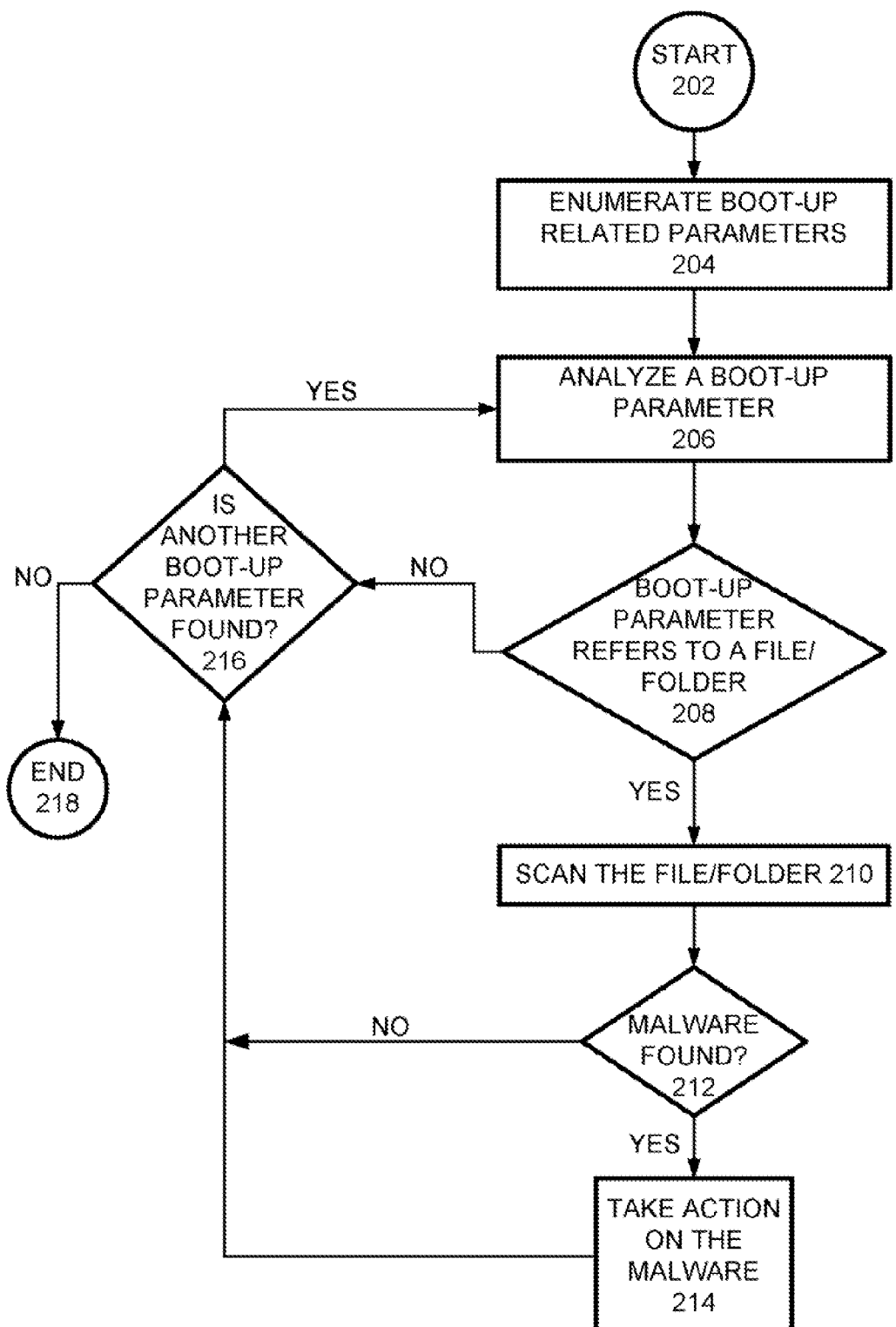
FIG. 2 shows, in an embodiment, a simplified flow chart for detecting and resolving stealth malware in a computer hard drive.

FIG. 2 shows, in an embodiment, a simplified flow chart for detecting and resolving stealth malware in a computer hard drive.

Consider the situation wherein, for example, a boot time-related malware has infiltrated a user's computer system and modified the computer system's production OS, thereby enabling the boot time-related malware to be launched when the production OS is being booted up. As aforementioned, once the boot time-related malware is actively running, the boot time-related malware is usually able to mask its presence from anti-virus engines. Thus, any method that is going to be successful in masking its presence is going to have to include preventing the boot time-related malware from being launched.

At a first step 202, a quick scan arrangement may be activated. As aforementioned, quick scan arrangement may include at least an active OS, an anti-virus engine. In an embodiment, the quick scan arrangement may be implemented on the same hard disk as the infected OS, albeit on a partition that is different from the partition containing the infected OS. Those skilled in the art are aware that a single computer system may include a plurality of operating environments, which may be independent of one another. Thus, even though one operating environment may be infected, the other operating environments may remain unaffected. In another embodiment, the quick scan arrangement may be stored within a peripheral component (e.g., a CD, a flash drive, another hard drive, and the like). Regardless of whether the quick scan arrangement is stored within the same computer system or on a peripheral component, when the computer system is first powered up, if there are more than one operating system environment, the user may be provided with a user-selectable menu from which the user may be able to determine which operating environment the user may wish to launch. Thus, the user is able to choose the active OS of the quick scan arrangement without having to activate the infected OS, thereby preventing the boot time-related malware from being launched.

Once the active OS has been launched, at a next step 204, the analysis logic module may access the infected hard drive and enumerate boot-up related parameters (e.g., the registry keys and/or configuration settings) for the dormant. OS. By enumerating the boot-up related parameters, the analysis logic module is effectively narrowing the search perimeters for boot time-related malwares to only settings that may enable the boot time-related malwares to be launched during the boot-up sequence of a computer system.

At a next step 206, the analysis logic module may analyze the first boot-up parameters (e.g., the registry keys and/or configuration settings).

At a next step 208, the analysis logic module may make a determination if the first boot-up parameter is associated with a set of existing files and/or folders on the computer system.

If the first boot-up parameter is associated with a set of existing files and/or folders, at a next step 210, the anti-virus engine associated with the quick scan arrangement may scan the file and/or folder. In an embodiment, the set of existing files/folders may include one or more files/folders.

As part of the scanning process, the anti-virus engine may make a determination on whether or not the set of files/folders being scanned include malicious code (step 212). As can be appreciated from the foregoing, since the boot time-related malware is dormant, the boot time-related malware is unable to hide its presence from other applications, such as the anti-virus engine.

If malware is identified, then at a next step 214, actions (such as, for example, quarantining and removing the malware) may be performed by the anti-virus engine. In addition, the anti-virus engine may log the event in order to provide a history of the actions that may have been performed. Further, the registry key associated with the malware may be removed from the dormant OS registry in order to prevent an error from occurring during future boot-up sequences since the set of files and/or folders associated with the registry key is no longer available.

At a next step 216, the analysis logic module may check to determine if another boot-up parameter is available for analysis. If another boot-up parameter is available, then steps 206-214 are repeated until all boot-up parameters have been analyzed.

Referring back to step 208, if the boot-up parameter does not refers to a set of files and/or folders, then the analysis logic module may proceed to step 216 to analyze the next boot-up parameter.

Similarly, at step 212, if malware has not been identified during the scanning of the set of files and/or folders, then the analysis module may also proceed to step 216 to analyze the next boot-up parameters.

Note that if all boot-up parameters have been analyzed (step 216), then the quick scan arrangement may be powered off and the dormant OS may be re-activated (step 218). Since the boot-up parameters are usually associated with a limited set of files and/or folders, the amount of time that may have to be dedicated to perform the quick scan may be substantially less than that of the prior art. In an example, the prior art method of scanning the entire hard drive can be time-consuming, especially when many of the computer systems may now have the storage capacity of 300 gigabytes or more. However, since the boot-up parameters and their associated set of files and/or folders usually represent a small percentage of the overall storage capacity, the amount of time that may be needed to scan the identified files and/or folders may be substantially reduced from a few hours to a few minutes. With the quick scan method, boot time-related malwares may be quickly identified and handled, thereby enabling the infected computer system to be restored to an operating environment freed from boot time-related malware.

As can be appreciated from the forgoing, one or more embodiments of the present invention provide a quick scan arrangement and methods to efficiently and effectively detect malwares, especially stealth malwares. With the present invention, entire hard drives do not have to be scanned in order to identify and remove the stealth malware. Instead, scanning the files that may be associated with the boot-up sequence, such as the registry keys and/or the configuration settings, can vastly reduce or minimize the processing power and time previously utilized to identify, clean, and/or remove stealth malware.

While this invention has been described in terms of several preferred embodiments, there are alterations, permutations, and equivalents, which fall within the scope of this invention. Although various examples are provided herein, it is intended that these examples be illustrative and not limiting with respect to the invention. For example, although the anti-virus engine is described in the example, the scanning may be performed by any suitable malware scanning engine. Likewise, scanning detection not only detects computer viruses but may also (or instead) detect any boot-time related malware, including worms, trojan horses, spyware, adware, and other malicious and unwanted software, etc.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A system for detecting malware in a computer storage drive that stores computer readable code implementing at least a first operating system, said computer storage drive being installed in a computer system, the system comprising:
   a second operating system different from said first operating system;
   an analysis module configured to execute under said second operating system, said analysis module being further configured to ascertain, while said first operating system is inactive, at least a first boot-up parameter of said first operating system that would be involved in booting up said computer system if said first operating system had been activated instead, said analysis module being further configured to identify at least one of a first file and a first folder that said first boot-up parameter refers to; and
   a malware scanning engine configured for scanning, while said first operating system is inactive, said at least one of said first file and said first folder after said at least one of said first file and said first folder has been identified by said analysis module, said malware scanning engine being further configured for neutralizing said malware responsive to said scanning if said at least one of said first file and said first folder includes said malware, wherein said second operating system is configured to become dormant after said malware is neutralized in order to enable said first operating system to boot up said computer system.

2. The system of claim 1 wherein said first boot-up parameter is a registry key associated with said first operating system.

3. The system of claim 1 wherein said first boot-up parameter is a configuration setting parameter associated with said first operating system.

4. The system of claim 1 wherein
   said analysis module is further configured to ascertain a second boot-up parameter after said malware scanning engine has scanned said at least one of said first file and said first folder,
   said analysis module is further configured to determine whether said second boot-up parameter refers to at least a file or at least a folder, and
   said analysis module is further configured to ascertain a next boot-up parameter if said second boot-up parameter does not refer to any file or folder.

5. The system of claim 1 wherein said first file is a start-up file.

6. The system of claim 1 wherein
   said analysis module is further configured to ascertain a second boot-up parameter of said first operating system after said malware scanning engine has neutralized said malware,
   said analysis module is further configured to identify at least one of a second file and a second folder that said second boot-up parameter refers to, and
   said malware scanning engine is further configured to scan said at least one of said second file and said second folder after said at least one of said second file and said second folder has been identified by said analysis module.

7. The system of claim 1 wherein said second operating system is stored on a peripheral component different from said computer storage drive.

8. The system of claim 1 wherein said second operating system is stored on a memory storage medium outside of said computer storage drive.

9. The system of claim 1 wherein said second operating system is also stored on said computer storage drive.

10. A method for detecting malware in a computer storage drive that stores computer readable code implementing at least a first operating system, said computer storage drive being installed in a computer system, the method comprising:
    activating a second operating system different from said first operating system;
    ascertaining, using an analysis module executing under said second operating system while said first operating system is inactive, at least a first boot-up parameter of said first operating system that would be involved in booting up said computer system if said first operating system had been activated instead;
    identifying, using said analysis module, at least one of a first file and a first folder that said first boot-up parameter refers to;
    after said identifying, scanning, using a malware scanning engine executing under said second operating system while said first operating system is inactive, said at least one of said first file and said first folder; and
    if said at least one of said first file and said first folder includes said malware, neutralizing said malware responsive to said scanning while said first operating system is inactive, wherein said scanning is performed while said computer storage drive remains installed in said computer system.

11. The method of claim 10 wherein said first boot-up parameter is a registry key associated with said first operating system.

12. The method of claim 10 wherein said first boot-up parameter is a configuration setting parameter associated with said first operating system.

13. The method of claim 10 further comprising:
ascertaining, using said analysis module, a second boot-up parameter after said malware scanning engine has scanned said at least one of said first file and said first folder;
determining, using said analysis module, whether said second boot-up parameter refers to at least a file or at least a folder; and
ascertaining, using said analysis module, a next boot-up parameter if said second boot-up parameter does not refer to any file or folder.

14. The method of claim 10 wherein said first file is a start-up file.

15. The method of claim 10 further comprising:
ascertaining, using said analysis module, a second boot-up parameter of said first operating system after said malware scanning engine has neutralized said malware;
identifying, using said analysis module, at least one of a second file and a second folder that said second boot-up parameter refers to; and
scanning, using said malware scanning engine, said at least one of said second file and said second folder after said at least one of said second file and said second folder has been identified using said analysis module.

16. The method of claim 10 further comprising:
providing a menu to a user for enabling said user to at least select one of a first operating system environment associated with said first operating system and a second operating system environment associated with said second operating system;
after said providing, receiving a choice of said second operating system environment selected by said user;
in response to said choice, performing said activating said second operating system without activating said first operating system, thereby preventing said malware from being launched.

17. The method of claim 10 wherein said second operating system is stored on a memory storage medium outside of said computer storage drive.

18. The method of claim 10 wherein said second operating system is also stored on said computer storage drive.

19. A method for detecting malware in a computer that employs a production operating system during normal use, the method comprising:
activating on said computer a first operating system different from said production operating system, said activating being performed while said production operating system is dormant;
ascertaining, while said first operating system is activated and while said production operating system is dormant, at least a first boot-up parameter of said production operating system that would be involved in booting up said computer if said production operating system had been activated instead;
identifying, using said analysis module, at least one of a first file and a first folder that said first boot-up parameter refers to;
after said identifying, scanning, while said first operating system is activated and while said production operating system is dormant, said at least one of said first file and said first folder; and
if said at least one of said first file and said first folder includes said malware, neutralizing, while said first operating system is activated and while said production operating system is dormant, said malware responsive to said scanning.

20. The method of claim 19 wherein said first operating system is stored on a flash drive different from a memory device employed to store said production operating system.

* * * * *